US012460489B2

(12) United States Patent
Gunasekaran

(10) Patent No.: US 12,460,489 B2
(45) Date of Patent: *Nov. 4, 2025

(54) REPLACEABLE FLAPPER SEAT ASSEMBLY FOR A SAFETY VALVE IN A WELLBORE

(71) Applicant: Halliburton Energy Services, Inc., Houston, TX (US)

(72) Inventor: Mohan Gunasekaran, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,525

(22) Filed: May 17, 2024

(65) Prior Publication Data

US 2024/0301759 A1 Sep. 12, 2024

Related U.S. Application Data

(63) Continuation of application No. 17/972,016, filed on Oct. 24, 2022, now Pat. No. 11,993,990.

(51) Int. Cl.
*E21B 23/00* (2006.01)
*F16K 1/42* (2006.01)

(52) U.S. Cl.
CPC .............. *E21B 23/00* (2013.01); *F16K 1/427* (2013.01); *E21B 2200/05* (2020.05)

(58) Field of Classification Search
CPC .......... E21B 23/00; E21B 34/10; E21B 34/08; E21B 2200/05; F16K 1/427
See application file for complete search history.

(56) References Cited

U.S. PATENT DOCUMENTS

2009/0071654 A1* 3/2009 O'Malley ............ E21B 34/105 166/321
2015/0361763 A1* 12/2015 Mailand .................. E21B 34/10 166/321
2017/0218722 A1* 8/2017 Gordon ................. E21B 34/063
2017/0335658 A1* 11/2017 Williamson ............ E21B 34/00
2019/0376367 A1* 12/2019 Burris ...................... E21B 34/14
2020/0256155 A1* 8/2020 Quilico ................. E21B 34/101
2024/0125205 A1* 4/2024 Gonzalez ................ E21B 34/14

* cited by examiner

*Primary Examiner* — Yong-Suk (Philip) Ro
(74) *Attorney, Agent, or Firm* — Kilpatrick Townsend & Stockton LLP

(57) ABSTRACT

A flapper seat assembly can be replaceable with respect to a safety valve positioned downhole in a wellbore. For example, the safety valve can be positioned downhole in a wellbore and can include a housing. Additionally, the safety valve can include a flow tube that can be coupled to a downhole tool. The flow tube can be removed from the safety valve in response to a first force applied to the flow tube. A portion of the flapper seat assembly can be detached from a housing profile to remove the flapper seat assembly from the wellbore in response to a second force applied to the flapper seat assembly. After removing the flapper seat assembly, a second flapper seat assembly can be attached to the safety valve.

20 Claims, 3 Drawing Sheets

REPLACEABLE FLAPPER SEAT ASSEMBLY FOR A SAFETY VALVE IN A WELLBORE

CROSS-REFERENCE

This is a continuation of U.S. patent application Ser. No. 17/972,016, titled "Replaceable Flapper Seat Assembly for a Safety Valve in a Wellbore," and filed Oct. 24, 2022, the entirety of which is incorporated by reference herein.

TECHNICAL FIELD

The present disclosure relates generally to wellbore tools and, more particularly (although not necessarily exclusively), to a replaceable flapper seat assembly for a safety valve in a wellbore.

BACKGROUND

A wellbore can be formed in a subterranean formation for extracting produced hydrocarbon or other suitable material. A wellbore operation can be performed to extract the produced hydrocarbon material. During a wellbore completion operation, a safety valve, such as a tubing-retrievable safety valve, can be deployed in the wellbore to enable access of the wellbore through the tubing-retrievable safety valve. The safety valve can include a flapper seat assembly that can prevent backflow of a downhole fluid from the wellbore to a well surface. The flapper seat assembly can include a flapper valve and a seat. The seat can generate a tight seal for the safety valve. Malfunctions regarding the flapper seat assembly may lead to safety hazards for the wellbore operation. The flapper seat assembly can be difficult to replace once deployed downhole in the wellbore.

DETAILED DESCRIPTION

Figure 1:
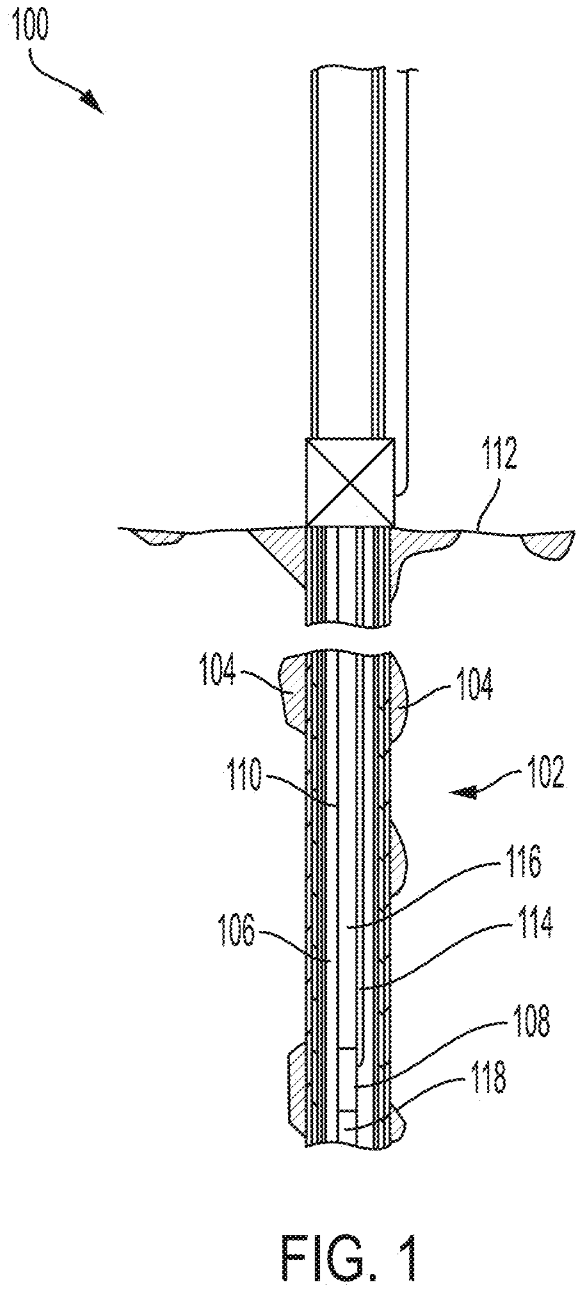
FIG. 1 is a schematic of a well system with a safety valve that includes a replaceable flapper seat assembly according to one example of the present disclosure.

Certain aspects and examples of the present disclosure relate to a replaceable flapper seat assembly for a safety valve in a wellbore. The safety valve can include a flapper seat assembly for controlling flow of downhole fluid through a tubing string in the wellbore. The downhole fluid can be transported through a flow tube in the safety valve when the flapper seat assembly is in an open position. In some examples, the flapper seat assembly or the flow tube may need to be removed for repair or replacement. The flapper seat assembly can decrease in sealing effectiveness over time while deployed downhole, thereby increasing a likelihood of the downhole fluid leaking through the safety valve. Seal failure of the flapper seat assembly can result from exposure to corrosive fluids, exposure to relatively high temperature and relatively high pressure, or other downhole conditions that can cause material degradation. Additionally or alternatively, the flow tube can develop fractures or other weaknesses that can cause the flow tube to leak the downhole fluid. Typically, removing a failed safety valve from the wellbore may require the removal of the entire completion. In other cases, a smaller safety valve can be placed within the existing failed safety valve. The reduced inner diameter of the smaller safety valve can reduce the amount of downhole fluid that can pass through the safety valve and tubing string. By using a replaceable flapper seat assembly that can be removed from a housing of the safety valve that remains downhole, interruption or prevention of wellbore operations can be minimized. For example, the tubing string and housing of the safety valve can remain in the wellbore while the flapper seat assembly and flow tube are removed and replaced. Additionally, a replacement flapper seat assembly and flow tube can have a similar inner diameter as the original flapper seat assembly and flow tube.

To remove the flapper seat assembly from the safety valve, the flow tube can first be removed from the wellbore by using a downhole tool to apply a first force. The flow tube may be coupled to a housing via a collet attached to a connecting ring in the housing. Applying the force can deform the collet to disengage the collet from the connecting ring, allowing the flow tube to be removed from the safety valve. After the flow tube is removed from the safety valve, the valve assembly can similarly be removed from the safety valve. For example, the flapper seat assembly can include a first assembly profile in an inner diameter of the flapper seat assembly that can couple to a first tool profile of an outer diameter of the downhole tool. Additionally, the flapper seat assembly can include a second assembly profile on an outer diameter of the flapper seat assembly. The second assembly profile can engage with a housing profile on an inner profile of the housing to couple the flapper seat assembly to the housing. The downhole tool coupled to the inner diameter of the flapper seat assembly can provide a second force that detaches the second assembly profile of the flapper seat assembly from the housing profile. The flapper seat assembly can then be removed from the safety valve and the wellbore by the downhole tool while the housing remains downhole. A repaired or replacement flapper seat assembly and flow tube can be inserted and attached to the housing in a similar manner. Thus, the flapper seat assembly and flow tube can be removed from and inserted into the wellbore without removal of the housing or tubing string.

After removing a first flow tube and a first valve assembly from the safety valve in the wellbore, a second flapper seat assembly can be inserted into the safety valve as a replacement. The second flapper seat assembly can include the same first assembly profile in an inner diameter as the first flapper seat assembly. The first assembly profile can couple with the first tool profile in the downhole tool for positioning the second flapper seat assembly downhole in the safety valve. The second flapper seat assembly can be coupled with the safety valve by attaching the second assembly profile in its outer diameter with the housing profile in the housing of the safety valve. Compared to the first flapper seat assembly removed from the wellbore, the second flapper seat assembly can form a tighter seal for preventing the backflow. Additionally, an inner diameter for the safety valve with the first flapper seat assembly can be similar to an inner diameter for the safety valve with the second flapper seat assembly, thereby maintaining a similar production flow for subsequent wellbore operations.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a well system 100 with a safety valve 108 that includes a replaceable flapper seat assembly according to one example of the present disclosure. The well system 100 can include a wellbore 102 formed within a subterranean formation 104 below a well surface 112. The wellbore 102 is depicted in FIG. 1 with a subsea well, but the safety valve 108 may be deployed in other environments. A casing 106 can include piping positioned within the wellbore 102 for protecting or structurally strengthening the wellbore 102. Examples of material for the casing 106 can include stainless steel, carbon steel, or other suitable material that can withstand downhole conditions. The casing 106 can be coupled to the wellbore 102 using cement or other suitable coupling material. Additionally, the casing 106 can include a cement sheath to support the casing.

A tubing string 110 can include piping that can be positioned downhole in the wellbore 102 using a downhole tool. An uphole portion of the tubing string 110 can be referred to as an uphole tubing string 116, while a downhole portion of the tubing string 110 can be referred to as a downhole tubing string 118. Downhole fluid can be transported from a downhole region in the wellbore 102 to the well surface 112 through the tubing string 110. Additionally or alternatively, drilling fluid can be transported from the well surface 112 to the downhole region in the wellbore 102 for transporting downhole debris from an annulus of the wellbore 102. Materials for the tubing string 110 can include carbon steel, aluminum, or other material suitable for downhole conditions.

The safety valve 108 can be a subsurface safety valve, such as a tubing-retrievable safety valve (TRSV), a surface-controlled subsurface safety valve (SCSSV), or other suitable downhole safety valve. To control fluid flow for the downhole fluid, the safety valve 108 can be coupled to the tubing string 110. A housing of the safety valve 108 can have a first end coupled to the uphole tubing string 116 and a second end coupled to a downhole tubing string 118. The safety valve 108 can prevent backflow for the downhole fluid, thereby minimizing safety hazards for a wellbore operation. Examples of the safety hazards can include uncontrolled release of the downhole fluid, damage to a production-control facility positioned above the well surface 112, or other hazardous conditions. In some examples, the safety valve 108 can be designed to isolate the wellbore 102 in response to system failure or damage to the production-control facility.

In some examples, downhole conditions may cause components, such as the flapper seat assembly, of the safety valve 108 to fail, thereby increasing a risk of the safety hazards occurring. To address failure of the flapper seat assembly, the downhole tool can remove the flapper seat assembly for repair or for replacement. The downhole tool can apply a force to the flapper seat assembly that detaches the flapper seat assembly from the safety valve 108 while other components, such as the housing, of the safety valve 108 remain downhole in the wellbore 102. Once the flapper seat assembly is removed from the wellbore 102, the flapper seat assembly can be repaired before being replaced in the safety valve 108. Alternatively, a replacement flapper seat assembly can be inserted by the downhole tool into the safety valve 108. A flow rate of the downhole fluid through the safety valve 108 with the replacement flapper seat assembly can be similar to the flow rate of the downhole fluid through the safety valve 108 with the flapper seat assembly.

A control line 114 can be coupled to the safety valve 108 to actuate the safety valve 108 between the open position and the closed position. The control line may be a hydraulic control line for actuating the safety valve 108. Alternatively, the control line 114 may actuate the safety valve 108 with electrical, optical, or other suitable signals. In some examples, the safety valve 108 may not require any control line and may be actuated by an automated process executed within the safety valve 108. Additionally, the control line 114 can be communicatively coupled to a control system in the production-control facility. Examples of the control system can include a computing system or a user-operated system. The control system can use the control line 114 to adjust the pivoting of the safety valve 108.

Figure 2:
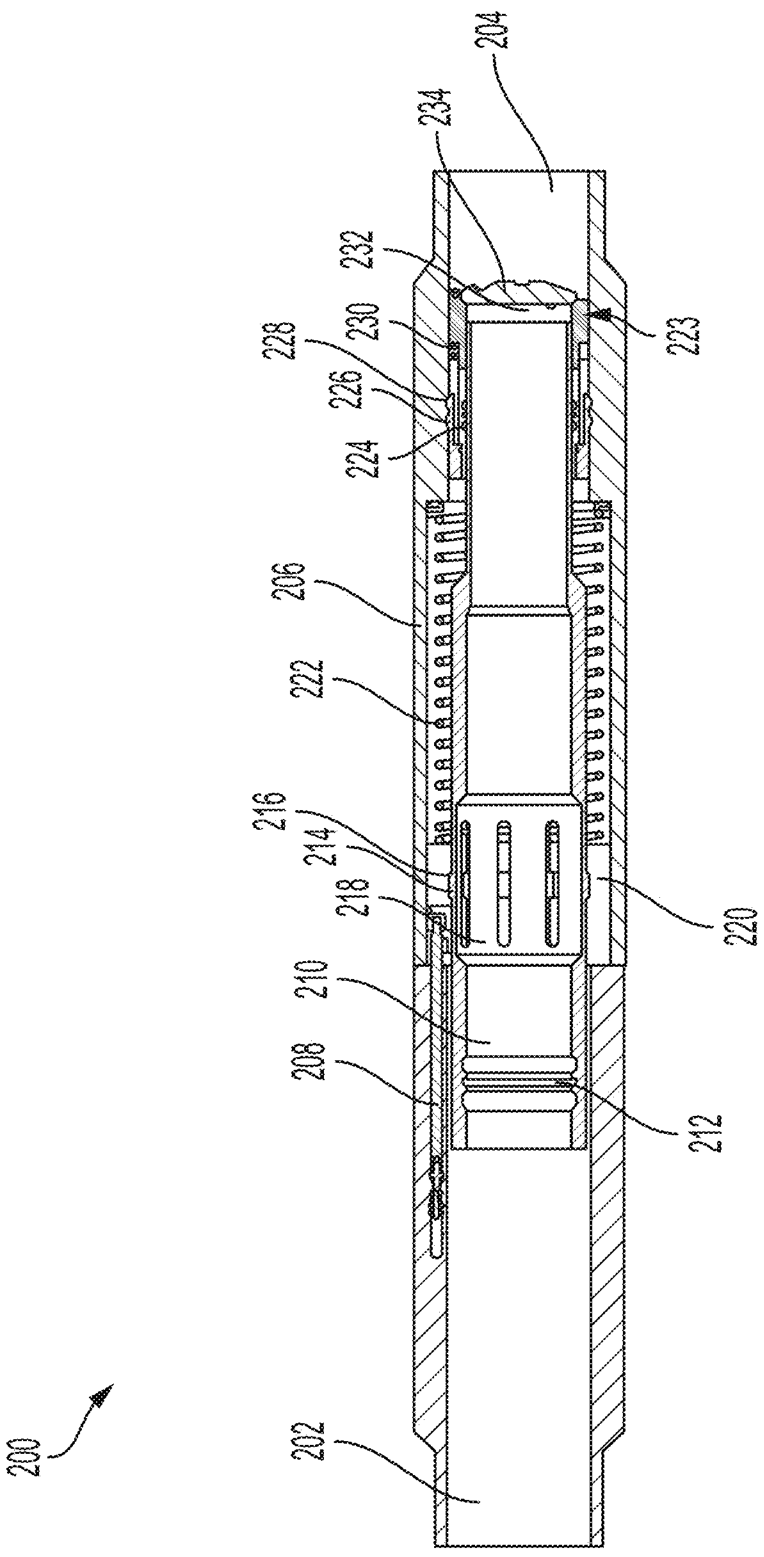
FIG. 2 is an example of a cross-sectional view of a safety valve with a flapper seat assembly that is replaceable according to one example of the present disclosure.

FIG. 2 is an example of a cross-sectional view of a safety valve 200 with a flapper seat assembly 223 that is replaceable according to one example of the present disclosure. The safety valve 200 can be a subsurface safety valve, such as a TRSV or a SCSSV. FIG. 2 is described with reference to components shown in FIG. 1. The safety valve 200 depicted in FIG. 2 can be the safety valve 108 from FIG. 1.

The safety valve 200 can be positioned downhole in a wellbore 102 to control fluid flow from a subterranean formation 104 through a tubing string 110 in the wellbore 102. A housing 206 of the safety valve 200 can have a first end 202 coupled to an uphole tubing string 116 and a second end 204 coupled to a downhole tubing string 118. The housing 206 additionally can include a connecting ring 220 by which a flow tube 210 for the safety valve 200 is coupled to the safety valve 200. The downhole fluid can flow from the downhole tubing string 118, through the flow tube 210 of the safety valve 200, and through the uphole tubing string 116 for transportation to the well surface 112.

The flow tube 210 can include a first flow tube profile 212 and a second flow tube profile 214 on an outer diameter of the flow tube 210. The first flow tube profile 212 can be used to remove the flow tube 210 from the safety valve 200. The second flow tube profile 214 can couple the flow tube 210 to the housing 206. To remove the flow tube 210 from the housing 206, a downhole tool can be inserted into the safety valve 200. The downhole tool can include a first tool profile on an outer diameter of the downhole tool and a second tool profile on an inner diameter of the downhole tool. The second tool profile can couple to the first flow tube profile 212. For example, the first flow tube profile 212 can include indentations that can interface with indentations on the second tool profile to securely couple the downhole tool to the flow tube 210. Additionally, the indentations on the first flow tube profile 212 can interface with the indentations on the second tool profile to further secure a connection between the flow tube 210 and the downhole tool. After coupling the first tool profile to the first flow tube profile 212, the downhole tool can detach the flow tube 210 from the safety valve 200.

To detach the flow tube 210, the downhole tool can apply a first force to detach an attachment mechanism, such as a collet 218, from the connecting ring 220 positioned within the housing 206. Although FIG. 2 depicts a collet as the attachment mechanism, additional examples of the attachment mechanism can include a latch, a hydraulic coupling, an electrical coupling, or an electromagnetic coupling that can be detached from the safety valve 200 by the downhole tool. The first force can compress the collet 218, causing the second flow tube profile 214 to detach from a ring profile 216 of the connecting ring 220. The collet 218 can be elastic such that the collet 218 can be compressed from a first structural configuration to a second structural configuration by the first force applied by the downhole tool. For example, the collet 218 may deform inwards to detach the flow tube 210 from the housing 206. The collet 218 may return to the first structural configuration after the first force is applied. The detached flow tube 210, still coupled to the downhole tool, can then be removed from the safety valve 200 and the wellbore 102 by the downhole tool. Removal of the flow tube 210 from the safety valve 200 can provide access to the flapper seat assembly for removal and replacement.

The flapper seat assembly 223 can include a flapper valve 234 to form a seal for preventing backflow of the downhole fluid. The flapper valve 234 can be a type of check valve that enables the downhole fluid to flow in one direction at a time. In some examples, the flapper seat assembly 223 may include another valve suitable for downhole deployment, such as a ball valve or a butterfly valve. Additionally, the flapper seat assembly 223 can include a seat 232 coupled to the flapper valve 234 for minimizing valve leakage. A sealant 230, such as a metal-to-metal seal or an O-ring, can be used to further strengthen the seal to prevent backflow through the safety valve 200. Materials for the sealant 230 can include carbon steel, nickel-based alloys, or other material suitable for downhole conditions.

The flapper valve 234 can pivot between an open position for allowing fluid flow through the safety valve 200 and a closed position for preventing fluid flow through the safety valve 200. The flapper valve 234 depicted in FIG. 2 is illustrated as being in the closed position. A control line 114 can be coupled to the safety valve 200 for actuating the safety valve 200 to adjust positioning of the flapper valve 234. To actuate the safety valve 200, the control line 114 can control a piston rod 208 positioned in the safety valve 200. The control line 114 can control the piston rod 208 to apply a force to a spring element 222 that encircles the flow tube 210. In response to the force, the spring element 222 can be actuated to pivot the flapper valve 234 between the open position and the closed position. Through exposure to downhole conditions, such as relatively high temperature and relatively high pressure, the flapper valve 234 can deteriorate, which can increase a likelihood of leaking in the flapper valve 234. Examples of deterioration in the flapper valve 234 can include fractures, warping, or other deformations of the flapper valve 234. The flapper seat assembly 223 can be removed for replacement or repair to address failure of the flapper valve 234 or seat 232.

Subsequent to removing the flow tube 210 from the wellbore 102, the flapper seat assembly 223 can be removed by the downhole tool from the wellbore 102. The flapper seat assembly 223 can include a first assembly profile 224 on an inner diameter of the flapper seat assembly 223 and a second assembly profile 226 on an outer diameter of the flapper seat assembly 223. The first assembly profile 224 can be used to remove the flapper seat assembly 223 from the safety valve 200. The second assembly profile 226 can couple the flapper seat assembly 223 to a housing profile 228 on an inner diameter of the housing 206. To remove the flapper seat assembly 223 from the safety valve 200, the downhole tool can couple to the flapper seat assembly 223 using the first tool profile and the first assembly profile 224. For example, indentations on the first assembly profile 224 can interface with indentations on the first tool profile such that the first assembly profile 224 is securely attached to the first tool profile of the downhole tool. The downhole tool can then detach the flapper seat assembly 223 from the housing 206.

For example, the downhole tool can apply a second force to the flapper seat assembly 223. The applied force can detach the second assembly profile 226 from the housing profile 228. In some examples, indentations on the second assembly profile 226 can correspond to indentations on the housing profile 228. Alternatively, the second assembly profile 226 and the housing profile 228 can be collet profiles that deform and detach in response to the force applied by the downhole tool. The flapper seat assembly 223 can be removed from the wellbore 102 by the downhole tool after being detached from the safety valve 200. In some examples, the flapper seat assembly 223 can be detached from the housing 206 of the safety valve 200 by pressure triggers, electrical triggers, or a combination thereof. Additionally or alternatively, the flapper seat assembly 223 can be detached from the safety valve 200 using a cutting mechanism.

After removing the flapper seat assembly 223, a replacement flapper seat assembly can be inserted into the safety valve 200. A process for inserting the replacement flapper seat assembly into the safety valve 200 can be similar to removing the flapper seat assembly 223 from the safety valve 200, performed in reverse. Additionally, a first inner diameter of the flapper seat assembly 223 can be similar to a second inner diameter of the replacement flapper seat assembly. Accordingly, a flow rate of downhole fluid through the safety valve 200 can be maintained after replacing the flapper seat assembly 223 with the replacement flapper seat assembly.

Figure 3:
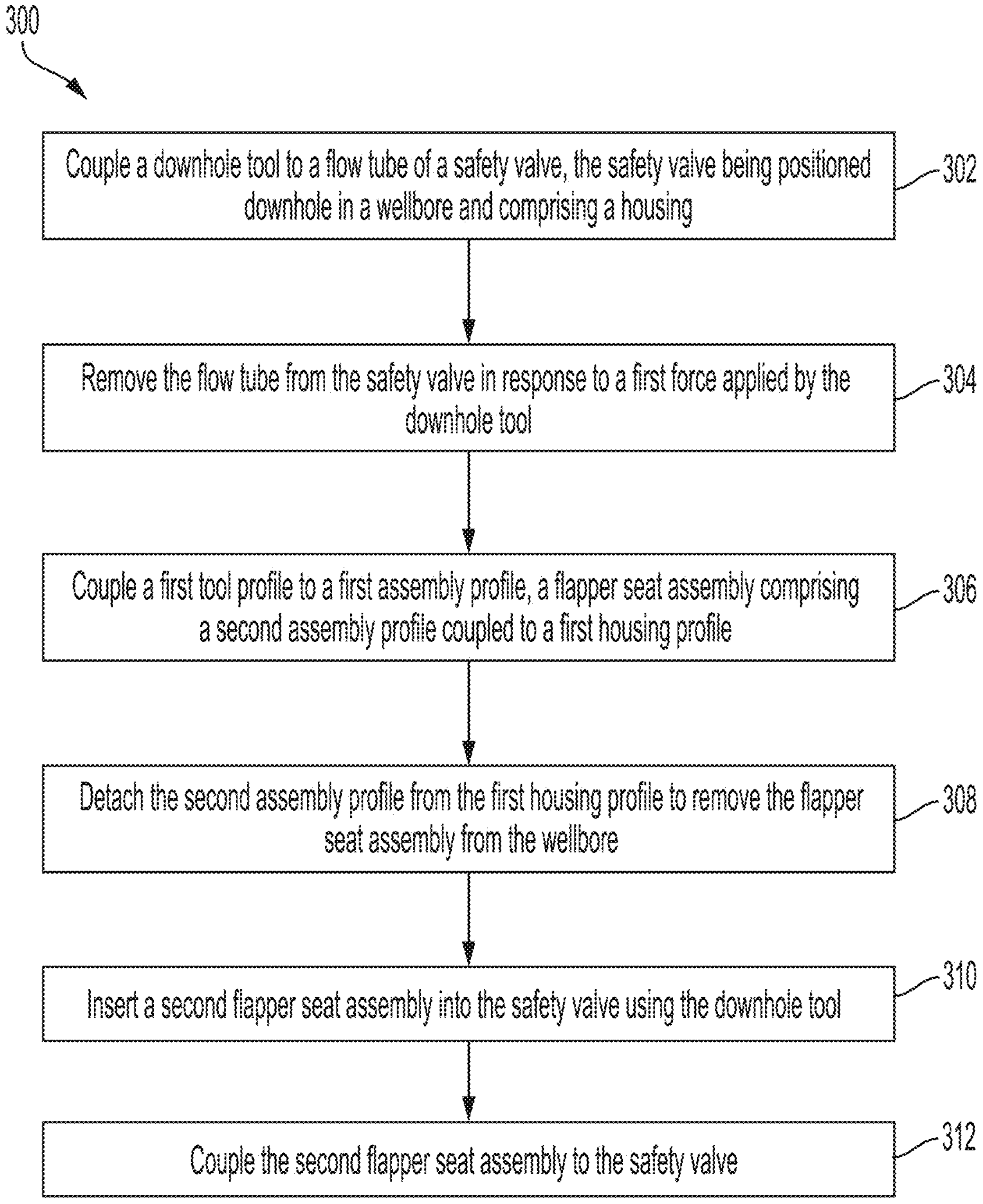
FIG. 3 is a flowchart of a process for removing and replacing a flapper seat assembly and flow tube in a safety valve according to one example of the present disclosure.

FIG. 3 is a flowchart of a process 300 for removing and replacing a flapper seat assembly 223 and flow tube in a safety valve 200 according to one example of the present disclosure. FIG. 3 is described with reference to FIGS. 1-2.

At block 302, the process 300 involves coupling a downhole tool to the flow tube 210 of a safety valve 200. The safety valve 200 can be positioned downhole in a wellbore 102 formed within a subterranean formation 104. To attach the flow tube 210 to the safety valve 200, a second flow tube profile 214 on an outer diameter of the flow tube 210 can couple to a ring profile 216 positioned on an inner diameter of the connecting ring 220. The downhole tool can include a first tool profile on an outer diameter of the downhole tool and a second tool profile on an inner diameter of the downhole tool. The second tool profile can couple to a first flow tube profile 212 on the outer diameter of the flow tube 210. Coupling the second tool profile to the first flow tube profile 212 can occur through pairing indentations, collet profiles, or any other suitable connection component.

At block 304, the process 300 involves removing the flow tube 210 from the wellbore 102 in response to a first force applied by the downhole tool. By coupling the second tool profile to the first flow tube profile 212, the downhole tool can apply a first force to the flow tube 210. The first force can exceed a first predetermined threshold, which can cause the flow tube 210 to detach from the safety valve 200. In some examples, detaching the flow tube 210 from the safety valve 200 can involve using the downhole tool to apply a pushing force before applying a pulling force.

For example, a collet 218 for the flow tube 210 can be detached from a connecting ring 220 positioned within the housing 206 after the first force exceeds the first predetermined threshold. The first force can compress the collet 218, which may deform the collet 218 to detach at the second flow tube profile 214 from a ring profile 216 on an inner diameter of the connecting ring 220. After detaching the flow tube 210 from the safety valve 200, the downhole tool can remove the flow tube 210 from the wellbore 102.

Removing the flow tube 210 from the safety valve 200 can provide access for the downhole tool to remove the flapper seat assembly 223 from the safety valve 200.

At block 306, the process 300 involves coupling the first tool profile to a first assembly profile 224 positioned on an inner diameter of the flapper seat assembly 223. The flapper seat assembly 223 can include a second assembly profile 226 on an outer diameter of the flapper seat assembly 223 that can couple to a housing profile 228 on an inner diameter of the housing 206. In some examples, the first tool profile can interface with the first assembly profile 224 to couple the downhole tool to the flapper seat assembly 223. The first assembly profile 224, the first tool profile, or a combination thereof may include a latching component to securely couple the flapper seat assembly 223 to the downhole tool.

At block 308, the process 300 involves detaching the second assembly profile 226 from the housing profile 228 to remove the flapper seat assembly 223 from the wellbore 102. By coupling the first tool profile to the first assembly profile 224, the downhole tool can apply a second force to detach the second assembly profile 226 from the housing profile 228. After detaching the flapper seat assembly 223 from the housing 206, the downhole tool can remove the flapper seat assembly 223 from the wellbore 102.

At block 310, the process 300 involves inserting a second flapper seat assembly into the safety valve 200 using the downhole tool. The flapper seat assembly 223 removed from the wellbore 102 can be a first flapper seat assembly 223. The second flapper seat assembly may generate a tighter seal compared to the first flapper seat assembly 223. The tighter seal can minimize a likelihood of leaking in the second flapper seat assembly. Additionally, an inner diameter of the safety valve with the first flapper seat assembly 223 can be similar to an inner diameter of the safety valve with the second flapper seat assembly. Maintaining a similar inner diameter of the safety valve can enable a similar production flow for subsequent wellbore operations.

In some examples, the second flapper seat assembly can include the first assembly profile 224, the second assembly profile 226, the flapper valve 234, or the seat 232. The first assembly profile 224 can be on an inner diameter of the second flapper seat assembly, while the second assembly profile 226 can be on an outer diameter of the second flapper seat assembly. Alternatively, the second flapper seat assembly may include a different valve, such as a ball valve or a globe valve, in place of the flapper valve 234. To insert the second flapper seat assembly into the safety valve 200, the downhole tool can couple the first assembly profile 224 to the first tool profile for securing the second flapper seat assembly to the downhole tool during insertion. The downhole tool can adjust a positioning of the second flapper seat assembly to engage the second assembly profile 226 with the housing profile 228.

At block 312, the process 300 involves coupling the second flapper seat assembly to the safety valve 200. The second assembly profile 226 on the second flapper seat assembly can engage with the housing profile 228 to couple the second flapper seat assembly to the housing 206. With the second flapper seat assembly coupled to the safety valve 200, the flow tube 210 can be repositioned within the safety valve 200 using the downhole tool. The collet 218 for the flow tube 210 can re-engage with the connecting ring 220 within the housing 206 by coupling the second flow tube profile 214 to the ring profile 216. Alternatively, a second flow tube can be inserted into the safety valve 200 using the downhole tool. The second flow tube can include the first flow tube profile 212 and the second flow tube profile 214.

The downhole tool can couple to the first flow tube profile 212 to insert the second flow tube into the safety valve 200 for coupling the second flow tube profile 214 with the ring profile 216.

In some aspects, a method, a system, and an apparatus for a replaceable flapper seat assembly for a safety valve in a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: removing a flow tube from a safety valve in response to a first force applied to the flow tube, the safety valve being positioned downhole in a wellbore and comprising a housing coupled with a flapper seat assembly via a housing profile of the housing; and subsequent to removing the flow tube, removing the flapper seat assembly of the safety valve from the wellbore in response to a second force applied to the flapper seat assembly, the flapper seat assembly detachable from the housing profile of the housing in response to the second force applied to the flapper seat assembly.

Example 2 is the method of example(s) 1, wherein the flapper seat assembly is a first flapper seat assembly, and wherein the method further comprises: subsequent to removing the first flapper seat assembly, inserting a second flapper seat assembly into the safety valve to replace the first flapper seat assembly; and coupling the second flapper seat assembly to the safety valve by engaging a portion of the second flapper seat assembly with a corresponding portion of the housing.

Example 3 is the method of example(s) 1-2, wherein the flow tube is a first flow tube and the flapper seat assembly is a first flapper seat assembly, and wherein the method further comprises, subsequent to coupling a second flapper seat assembly to the safety valve: inserting a second flow tube into the safety valve to replace the first flow tube; and coupling the second flow tube to the safety valve by engaging a collet of the second flow tube with a connecting ring positioned within the housing.

Example 4 is the method of example(s) 1-3, wherein removing the flow tube from the safety valve further comprises: detaching an attachment mechanism of the flow tube from the safety valve, wherein the attachment mechanism comprises at least one of: a collet, a latch, a hydraulic coupling, an electrical coupling, or an electromagnetic coupling.

Example 5 is the method of example(s) 1-4, wherein removing the flow tube from the safety valve further comprises applying the first force to compress a collet of the flow tube to detach the flow tube from a connecting ring positioned within the housing.

Example 6 is the method of example(s) 1-5, further comprising, prior to removing the flow tube from the safety valve pivoting a flapper valve within the flapper seat assembly from an open position to a closed position.

Example 7 is the method of example(s) 1-6, wherein pivoting the flapper valve within the flapper seat assembly from the open position to the closed position further comprises: actuating a piston rod within the safety valve to apply a third force to a spring element positioned in the housing; and actuating the spring element to pivot the flapper valve from the open position and the closed position in response to the third force.

Example 8 is the method of example(s) 1-7, wherein the housing is positioned downhole while removing the flapper seat assembly from the wellbore.

Example 9 is a system comprising: a tubing string positionable downhole in a wellbore; and a safety valve couplable to the tubing string, the safety valve comprising: a housing comprising a housing profile; a flow tube removable from the safety valve in response to a first force applied to the flow tube; and a flapper seat assembly removable from the safety valve in response to a second force applied to the flapper seat assembly, the flapper seat assembly detachable from the housing profile of the housing in response to the second force applied to the flapper seat assembly.

Example 10 is the system of example(s) 9, wherein the flapper seat assembly is a first flapper seat assembly, and wherein the system further comprises: a second flapper seat assembly couplable to the safety valve to replace the first flapper seat assembly, wherein the second flapper seat assembly is couplable to the safety valve by engaging a portion of the second flapper seat assembly with a corresponding portion of the housing.

Example 11 is the system of example(s) 9-10, wherein the flow tube is a first flow tube and the flapper seat assembly is a first flapper seat assembly, and wherein the system further comprises: a second flow tube including a collet configurable to engage with a connecting ring positionable within the housing to couple the second flow tube to the safety valve.

Example 12 is the system of example(s) 9-11, wherein an attachment mechanism of the flow tube is detachable from the safety valve, and wherein the attachment mechanism comprises at least one of a collet, a latch, a hydraulic coupling, an electrical coupling, or an electromagnetic coupling.

Example 13 is the system of example(s) 9-12, wherein the housing further comprises a connecting ring positionable within the housing, and wherein a collet of the flow tube is configurable to detach the flow tube from the connecting ring in response to the first force being applied to the flow tube.

Example 14 is the system of example(s) 9-13, wherein the flapper seat assembly further comprises: a flapper valve pivotable, prior to detaching the flapper seat assembly from the housing profile of the housing of the safety valve, from an open position to a closed position.

Example 15 is the system of example(s) 9-14, further comprising: a piston rod within the safety valve actuatable to apply a third force to a spring element positionable in the housing, wherein the spring element is actuatable to pivot the flapper valve from the open position and the closed position in response to the third force.

Example 16 is a safety valve comprising: a housing comprising a housing profile and positionable downhole in a wellbore; a flow tube removable from the safety valve in response to a first force applied by a downhole tool; and a flapper seat assembly removable from the safety valve in response to a second force applied to the flapper seat assembly, the flapper seat assembly detachable from the housing profile of the housing in response to the second force applied to the flapper seat assembly.

Example 17 is the safety valve of example(s) 16, wherein the flapper seat assembly is a first flapper seat assembly, and wherein the safety valve further comprises: a second flapper seat assembly couplable to the safety valve to replace the first flapper seat assembly, wherein the second flapper seat assembly is couplable to the safety valve by engaging a portion of the second flapper seat assembly with a corresponding portion of the housing.

Example 18 is the safety valve of example(s) 16-17, wherein the flow tube is a first flow tube and the flapper seat assembly is a first flapper seat assembly, and wherein the safety valve further comprises: a second flow tube couplable to the downhole tool via a collet of the second flow tube, wherein the collet is configurable to engage with a connecting ring positionable within the housing to couple the second flow tube to the safety valve.

Example 19 is the safety valve of example(s) 16-18, wherein an attachment mechanism of the flow tube is detachable from the safety valve, and wherein the attachment mechanism comprises at least one of a collet, a latch, a hydraulic coupling, an electrical coupling, or an electromagnetic coupling.

Example 20 is the safety valve of example(s) 16-19, wherein the housing further comprises a connecting ring positionable within the housing, and wherein a collet of the flow tube is configurable to detach the flow tube from the connecting ring in response to the first force being applied to the flow tube.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:

removing a flow tube from a safety valve in response to a first force applied to the flow tube, the safety valve being positioned downhole in a wellbore and comprising a housing coupled with a flapper seat assembly via a housing profile of the housing; and subsequent to removing the flow tube, removing the flapper seat assembly of the safety valve from the wellbore in response to a second force applied to the flapper seat assembly, the flapper seat assembly detachable from the housing profile of the housing in response to the second force applied to the flapper seat assembly.

2. The method of claim 1, wherein the flapper seat assembly is a first flapper seat assembly, and wherein the method further comprises:

subsequent to removing the first flapper seat assembly, inserting a second flapper seat assembly into the safety valve to replace the first flapper seat assembly; and coupling the second flapper seat assembly to the safety valve by engaging a portion of the second flapper seat assembly with a corresponding portion of the housing.

3. The method of claim 1, wherein the flow tube is a first flow tube and the flapper seat assembly is a first flapper seat assembly, and wherein the method further comprises, subsequent to coupling a second flapper seat assembly to the safety valve:

inserting a second flow tube into the safety valve to replace the first flow tube; and coupling the second flow tube to the safety valve by engaging a collet of the second flow tube with a connecting ring positioned within the housing.

4. The method of claim 1, wherein removing the flow tube from the safety valve further comprises:

detaching an attachment mechanism of the flow tube from the safety valve, wherein the attachment mechanism comprises at least one of: a collet, a latch, a hydraulic coupling, an electrical coupling, or an electromagnetic coupling.

5. The method of claim 1, wherein removing the flow tube from the safety valve further comprises applying the first force to compress a collet of the flow tube to detach the flow tube from a connecting ring positioned within the housing.

6. The method of claim 1, further comprising, prior to removing the flow tube from the safety valve;

pivoting a flapper valve within the flapper seat assembly from an open position to a closed position.

7. The method of claim 6, wherein pivoting the flapper valve within the flapper seat assembly from the open position to the closed position further comprises:

actuating a piston rod within the safety valve to apply a third force to a spring element positioned in the housing; and actuating the spring element to pivot the flapper valve from the open position and the closed position in response to the third force.

8. The method of claim 1, wherein the housing is positioned downhole while removing the flapper seat assembly from the wellbore.

9. A system comprising:

a tubing string positionable downhole in a wellbore; and a safety valve couplable to the tubing string, the safety valve comprising:

a housing comprising a housing profile;

a flow tube removable from the safety valve in response to a first force applied to the flow tube; and a flapper seat assembly removable from the safety valve in response to a second force applied to the flapper seat assembly subsequent to removing the flow tube from the safety valve, the flapper seat assembly detachable from the housing profile of the housing in response to the second force applied to the flapper seat assembly.

10. The system of claim 9, wherein the flapper seat assembly is a first flapper seat assembly, and wherein the system further comprises:

a second flapper seat assembly couplable to the safety valve to replace the first flapper seat assembly, wherein the second flapper seat assembly is couplable to the safety valve by engaging a portion of the second flapper seat assembly with a corresponding portion of the housing.

11. The system of claim 9, wherein the flow tube is a first flow tube and the flapper seat assembly is a first flapper seat assembly, and wherein the system further comprises:

a second flow tube including a collet configurable to engage with a connecting ring positionable within the housing to couple the second flow tube to the safety valve.

12. The system of claim 9, wherein an attachment mechanism of the flow tube is detachable from the safety valve, and wherein the attachment mechanism comprises at least one of a collet, a latch, a hydraulic coupling, an electrical coupling, or an electromagnetic coupling.

13. The system of claim 9, wherein the housing further comprises a connecting ring positionable within the housing, and wherein a collet of the flow tube is configurable to detach the flow tube from the connecting ring in response to the first force being applied to the flow tube.

14. The system of claim 9, wherein the flapper seat assembly further comprises:

a flapper valve pivotable, prior to detaching the flapper seat assembly from the housing profile of the housing of the safety valve, from an open position to a closed position.

15. The system of claim 14, further comprising:

a piston rod within the safety valve actuatable to apply a third force to a spring element positionable in the housing, wherein the spring element is actuatable to pivot the flapper valve from the open position and the closed position in response to the third force.

16. A safety valve comprising:

a housing comprising a housing profile and positionable downhole in a wellbore;

a flow tube removable from the safety valve in response to a first force applied by a downhole tool; and a flapper seat assembly removable from the safety valve in response to a second force applied to the flapper seat assembly subsequent to removing the flow tube from the safety valve, the flapper seat assembly detachable from the housing profile of the housing in response to the second force applied to the flapper seat assembly.

17. The safety valve of claim 16, wherein the flapper seat assembly is a first flapper seat assembly, and wherein the safety valve further comprises:

a second flapper seat assembly couplable to the safety valve to replace the first flapper seat assembly, wherein the second flapper seat assembly is couplable to the safety valve by engaging a portion of the second flapper seat assembly with a corresponding portion of the housing.

18. The safety valve of claim 16, wherein the flow tube is a first flow tube and the flapper seat assembly is a first flapper seat assembly, and wherein the safety valve further comprises:

a second flow tube couplable to the downhole tool via a collet of the second flow tube, wherein the collet is configurable to engage with a connecting ring positionable within the housing to couple the second flow tube to the safety valve.

19. The safety valve of claim 16, wherein an attachment mechanism of the flow tube is detachable from the safety valve, and wherein the attachment mechanism comprises at least one of a collet, a latch, a hydraulic coupling, an electrical coupling, or an electromagnetic coupling.

20. The safety valve of claim 16, wherein the housing further comprises a connecting ring positionable within the housing, and wherein a collet of the flow tube is configurable to detach the flow tube from the connecting ring in response to the first force being applied to the flow tube.

* * * * *